United States Patent
Dehlwes et al.

(10) Patent No.: US 9,278,597 B2
(45) Date of Patent: Mar. 8, 2016

(54) AIR SPRING FOR VEHICLES

(75) Inventors: Stephan Dehlwes, Norderstedt (DE); Jonny Dreves, Reinbek (DE)

(73) Assignee: VIBRACOUSTIC CV AIR SPRINGS GMBH, Hamburg (DE)

( * ) Notice: Subject to any disclaimer, the term of this patent is extended or adjusted under 35 U.S.C. 154(b) by 0 days.

(21) Appl. No.: 14/237,564

(22) PCT Filed: Jun. 14, 2012

(86) PCT No.: PCT/EP2012/002512
§ 371 (c)(1),
(2), (4) Date: Feb. 7, 2014

(87) PCT Pub. No.: WO2013/020614
PCT Pub. Date: Feb. 14, 2013

(65) Prior Publication Data
US 2014/0210170 A1 Jul. 31, 2014

(30) Foreign Application Priority Data
Aug. 8, 2011 (DE) .......................... 10 2011 109 674

(51) Int. Cl.
| F16F 9/05 | (2006.01) |
| B60G 17/052 | (2006.01) |
| B60G 11/27 | (2006.01) |

(52) U.S. Cl.
CPC ............ *B60G 11/27* (2013.01); *B60G 17/0521* (2013.01); *F16F 9/05* (2013.01); *F16F 9/052* (2013.01)

(58) Field of Classification Search
CPC ...................... B60G 2206/424; B60G 17/0485; B60G 17/0521; F16F 9/05; F16F 9/052; F16F 9/055; F16F 9/057; F16F 9/48; F16F 9/483

USPC ................ 280/6.15, 6.157, 5.514; 267/64.24, 267/64.23, 64.21, 64.19
See application file for complete search history.

(56) References Cited

U.S. PATENT DOCUMENTS

| 3,043,582 | A | | 7/1962 | Hirtreiter | |
| 3,850,437 | A | * | 11/1974 | Owen | ......................... 280/6.157 |
| 3,876,193 | A | | 4/1975 | Clary | |
| 4,200,270 | A | * | 4/1980 | Merkle | ...................... 267/64.24 |
| 4,518,154 | A | | 5/1985 | Merkle | |
| 4,718,650 | A | | 1/1988 | Geno | |
| 5,382,006 | A | | 1/1995 | Arnold | |
| 5,566,929 | A | * | 10/1996 | Thurow | ...................... 267/64.24 |
| 6,068,276 | A | | 5/2000 | Kallstrom | |
| 6,315,274 | B1 | | 11/2001 | Sonnak | |
| 2002/0130452 | A1 | | 9/2002 | Behmenburg et al. | |
| 2002/0158380 | A1 | | 10/2002 | Branco et al. | |

FOREIGN PATENT DOCUMENTS

| CN | 2133709 Y | 5/1993 |
| CN | 1103145 A | 5/1995 |

(Continued)

*Primary Examiner* — Keith Frisby
(74) *Attorney, Agent, or Firm* — Leydig, Voit & Mayer, Ltd.

(57) ABSTRACT

An air spring for a vehicle with a lifting function includes an upper rolling piston and a lower rolling piston disposed opposite to each other. A rolling bellows encloses a compressed air space and has double rolling folds. The pressure effective surfaces of the rolling folds are coordinated with each other in such a manner that, during dynamic spring operation of the air spring over a predetermined spring travel, the pressure effective surface of the rolling fold on the lower rolling piston is larger than the pressure effective surface of the rolling fold on the upper rolling piston.

10 Claims, 6 Drawing Sheets

(56) References Cited

FOREIGN PATENT DOCUMENTS

| | | |
|---|---|---|
| DE | 1107030 B | 5/1961 |
| DE | 2836662 C2 | 10/1979 |
| DE | 19607804 C1 | 5/1997 |
| DE | 19900087 A1 | 7/2000 |
| DE | 10111242 C1 | 8/2002 |
| DE | 102007027834 A1 | 12/2008 |
| DE | 102007042542 A1 | 3/2009 |
| EP | 1239181 A2 | 9/2002 |
| EP | 1171722 B1 | 2/2005 |

* cited by examiner

AIR SPRING FOR VEHICLES

CROSS-REFERENCE TO PRIOR APPLICATIONS

This application is a U.S. National Phase Application under 35 U.S.C. §371 of International Application No. PCT/EP2012/002512, filed on Jun. 14, 2012, and claims benefit to German Patent Application No. DE 10 2011 109 674.8, filed on Aug. 8, 2011. The International Application was published in German on Feb. 14, 2013 as WO 2013/020614 under PCT Article 21(2).

FIELD

The invention is concerned with the configuration of an air spring for vehicles, in which a large spring travel can be realized with a simultaneously small construction space. The air spring is intended to have a simple design and to permit cost-effective manufacturing. At the same time, the air spring is intended to be useable for commercial vehicles and to permit a raising or lowering of the level position of the vehicle.

BACKGROUND

In the case of air springs for passenger vehicle use, the use of rolling bellows with double rolling folds is described, for example, to EP 1 239 181 A2. However, in the embodiment described there, only a rolling piston for the lower rolling fold is provided. The upper rolling fold rests in a cutout on the cover of the air spring and has the single purpose of permitting the air spring to be pivotable with respect to the shock absorber which is connected thereto.

A further possibility in which an air spring is used with double rolling folds is dealt with in EP 1 171 722 B1. In the embodiment shown, the lower rolling fold rolls on a cylindrical rolling piston, whereas the upper rolling fold can carry out a small rolling movement on a conically extending rolling surface on the cover of the air spring. This arrangement of piston and cover and also of the double rolling fold is intended to result in an improvement in the comfort properties when an air spring is used.

The use of two opposite pistons and of a rolling bellows with double rolling folds is shown in FIG. 9 of DE 1 107 030. Two identically sized rolling pistons for the rolling folds are provided, and therefore this embodiment can only be used for spring purposes. This statement also applies to the embodiment in U.S. Pat. No. 3,876,193, in which the rolling folds are used solely for spring purposes. The two rolling folds move simultaneously during the cushioning operation.

Finally, U.S. Pat. No. 4,718,650 describes an air spring which requires very little space for the deflection operation, since the piston wall of the lower piston is fittable telescopically into a clearance on the upper piston when the air spring is compressed in the minimal position thereof. The air spring can be extended in such a manner that the lower rolling fold is completely detached from the lower rolling piston and the upper rolling fold is also pulled out of the receptacle. However, that part of the rolling bellows which forms the upper rolling fold is provided with an enclosure which prevents the upper rolling fold from rolling back into the starting position thereof. As claimed in the present construction, a reduction in pressure in the compressed air space alone cannot result in the rolling fold returning into the starting position thereof. Only the upper edge of the lower rolling piston can push the upper rolling fold back, but this does not lead to complete contact with the rolling fold; instead, air spaces remain. This construction is consequently not suitable for realizing a smooth execution of a lifting operation.

SUMMARY

In an embodiment, the present invention provides an air spring for a vehicle with a lifting function. An upper rolling piston and a lower rolling piston are disposed opposite to each other. A rolling bellows encloses a compressed air space and has double rolling folds. The pressure effective surfaces of the rolling folds are coordinated with each other in such a manner that, during dynamic spring operation of the air spring over a predetermined spring travel, the pressure effective surface of the rolling fold on the lower rolling piston is larger than the pressure effective surface of the rolling fold on the upper rolling piston.

BRIEF DESCRIPTION OF THE DRAWINGS

The present invention will be described in even greater detail below based on the exemplary figures. The invention is not limited to the exemplary embodiment. All features described and/or illustrated herein can be used alone or combined in different combinations in embodiments of the invention. The features and advantages of various embodiments of the present invention will become apparent by reading the following detailed description with reference to the attached drawings which illustrate the following.

The invention is explained in more detail below with reference to an exemplary embodiment which is illustrated in the drawing, in which, in a schematic illustration.

DETAILED DESCRIPTION

In order to realize the lifting operation, which is desired in the case of commercial vehicles, with an air spring, the latter is realized with two opposite rolling pistons and a rolling bellows which encloses a compressed air space and has double rolling folds. The pressure-effective surfaces of the rolling folds of the rolling pistons here are coordinated with each other in such a manner that, during the dynamic spring operation of the air spring over a predetermined spring travel, the effective surface WF2 of the rolling fold on the lower rolling piston is larger than the effective surface WF3 of the rolling fold on the upper rolling piston. It is thereby ensured that, via the predetermined spring travel of the air spring, only the rolling fold abutting against the lower rolling piston rolls along the rolling piston during the spring operation, while the rolling fold on the upper rolling piston remains in a contact area of the upper piston. During the spring operation, the pressure-effective diameter is changed in the two rolling folds, and therefore, in the event of a full rebound, the pressure-effective surfaces of the rolling folds are approximately identical in size. If, in this position, the compressed air in the compressed air space of the air spring is increased, the lifting operation is initiated and the upper rolling fold rolls on the upper rolling piston until the lifting operation is complete.

The vehicle body is lowered by the fact that compressed air is let out of the compressed air space, as a result of which, first of all, the upper rolling fold returns into the starting position thereof and then the spring operation of the air spring is taken over again by the lower rolling fold.

In the present invention, the lower rolling piston is preferably provided with a cylindrical outer surface on which the lower rolling fold can roll without hindrance during a spring operation. By contrast, the upper rolling piston has a section having a cylindrical outer surface, and an adjoining, concave base. At least half of the rolling fold abuts said base. The concave base has a circular arc of approx. 90°, which permits appropriate contact with the upper rolling fold. During the spring operation, the upper rolling fold remains at the base.

The piston can be configured without a cover end, and therefore a large compressed air space assisting the cushioning operation is available. Alternatively, in the case of smaller pistons, the piston can also be configured with a cover end. If the lower rolling piston does not have a cover, the upper rolling piston can dip into the lower rolling piston.

The ends of the rolling bellows are fastened to the mutually facing inner edges of the rolling pistons. A rolling bellows in the form of a tubular rolling bellows is preferably used. Said tubular rolling bellows can be preshaped conically with respect to the different diameters of the rolling pistons. The manufacturing is also simplified by the pistons being formed from deep-drawn metal sheets.

Figure 1:
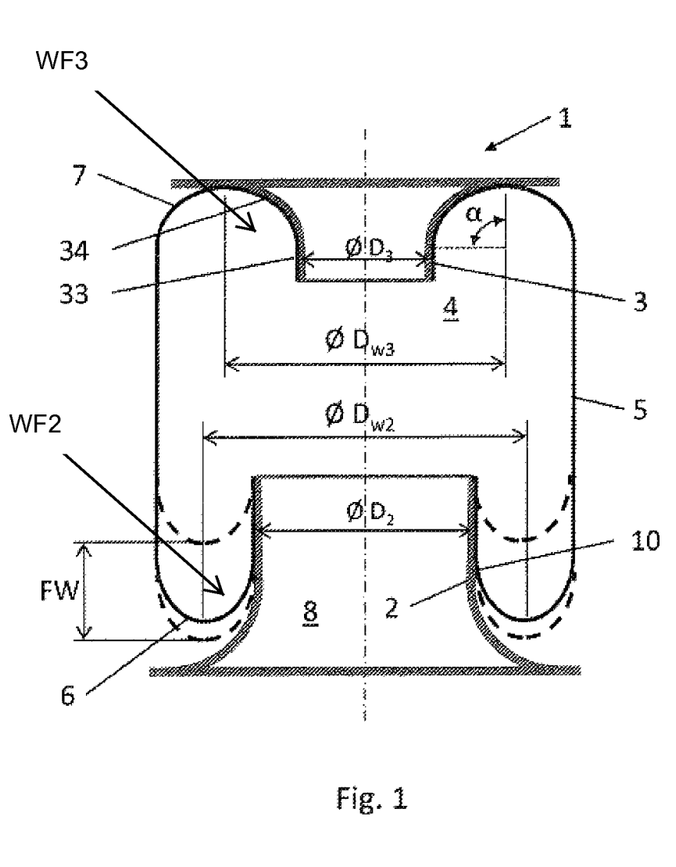
FIG. 1 shows a section through the air spring in the neutral position thereof.

FIG. 1 shows, in a schematic illustration, the air spring 1 in the neutral position thereof. The air spring 1 is provided with the lower rolling piston 2 and the upper rolling piston 3. The compressed air space 4 is enclosed by the rolling bellows 5. The rolling bellows 5 has the double rolling folds 6 and 7. The effective diameters of the rolling folds 6 and 7 are denoted by DW2 and DW3. The pressure-effective surfaces WF2 and WF3 of the rolling folds 6 and 7 are calculated therefrom. The effective diameters DW2 and DW3 therefore the effective surfaces WF2 and WF3 of the rolling folds 6 and 7 are co-ordinated with each other in such a manner that the spring operation of the air spring 1 takes place within the predetermined spring travel FW, to be precise only by way of the rolling fold 6 on the rolling piston 2. The spring travel FW and the positions of the rolling fold 6 reached in the process are indicated by dashed lines.

Figure 2:
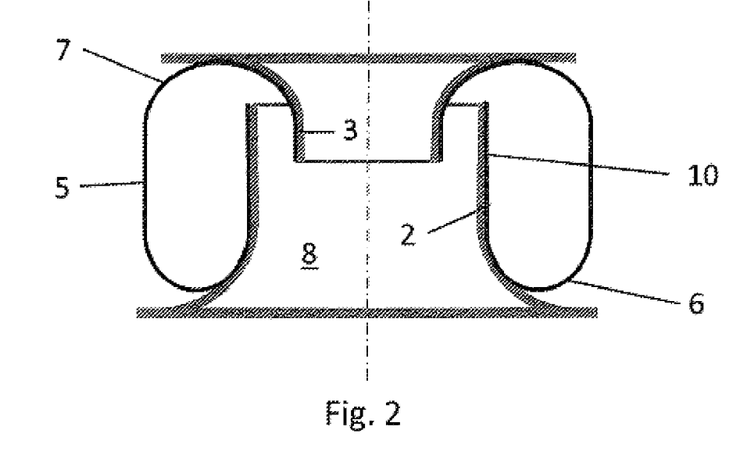
FIG. 2 shows the air spring according to FIG. 1 in the fully deflected position thereof.

The outside diameter D2 of the lower rolling piston 2 is greater than the outside diameter of the upper rolling piston 3. At least the lower rolling piston 2 does not have any covering with respect to the compressed air space 4, and therefore, in the event of a relatively strong deflection, the upper rolling piston 3 can dip into the interior of the lower rolling piston 2. This possibility is shown in FIG. 2, in which the upper rolling piston 3 is shown in the fully deflected position thereof with respect to the lower rolling piston 2.

Figure 3:
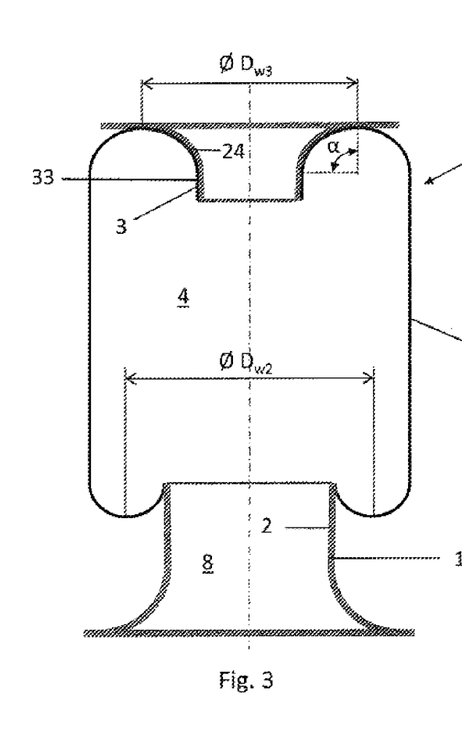
FIG. 3 shows the air spring according to FIG. 1 in the fully rebounded position.

FIG. 3 shows the air spring 1 in the fully rebounded position. Since, in the present example, the lower rolling piston 2 has a cylindrical outer surface 10, the pressure-effective diameter DW2 remains the same during the entire rolling operation of the rolling fold 6. Similarly, the pressure-effective diameter DW3 at the upper rolling fold 7 remains unchanged. Consequently, during the entire spring operation, the rolling fold 7 abuts fixedly in an unchanged manner against the upper rolling piston 3. The upper rolling piston 3 has a section 33 with a cylindrical outer surface and an adjoining concave base 34. The concave base 34 is configured as a circular arc with an angle $\alpha$ of at least 90°.

Figure 4:
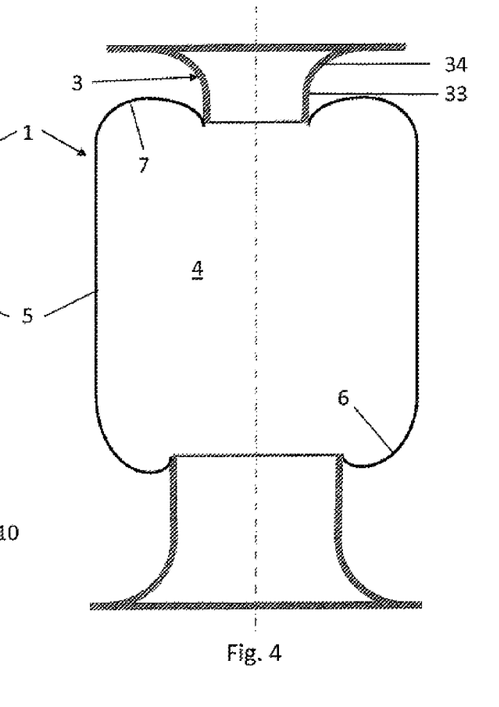
FIG. 4 shows the air spring in a lifted position.

The lifting operation is carried out after the air spring 1 has fully rebounded, as shown in FIG. 3, by compressed air being introduced into the compressed air space 4. The devices for supplying compressed air to, and letting compressed air out of, the compressed air space 4 are not shown specifically, since they are of a known construction. The air spring 1 is shown in the lifted position thereof in FIG. 4. During the lifting operation, the effective diameters DW2 and DW3 are approximated to each other, which facilitates the rolling operation on the upper rolling piston 3.

Figure 5:
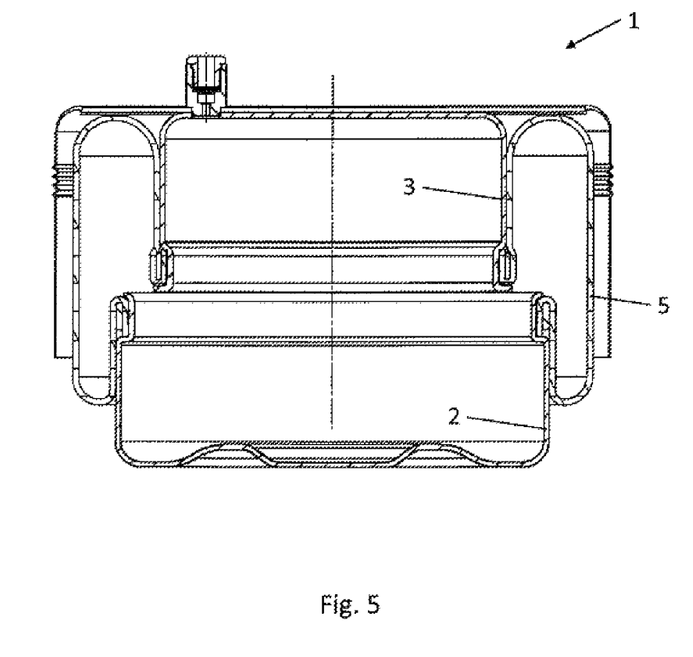
FIGS. 5, 6 and 7 show an air spring produced from deep-drawn metal sheets in the neutral position, fully deflected position and fully rebounded position thereof.
Figure 6:
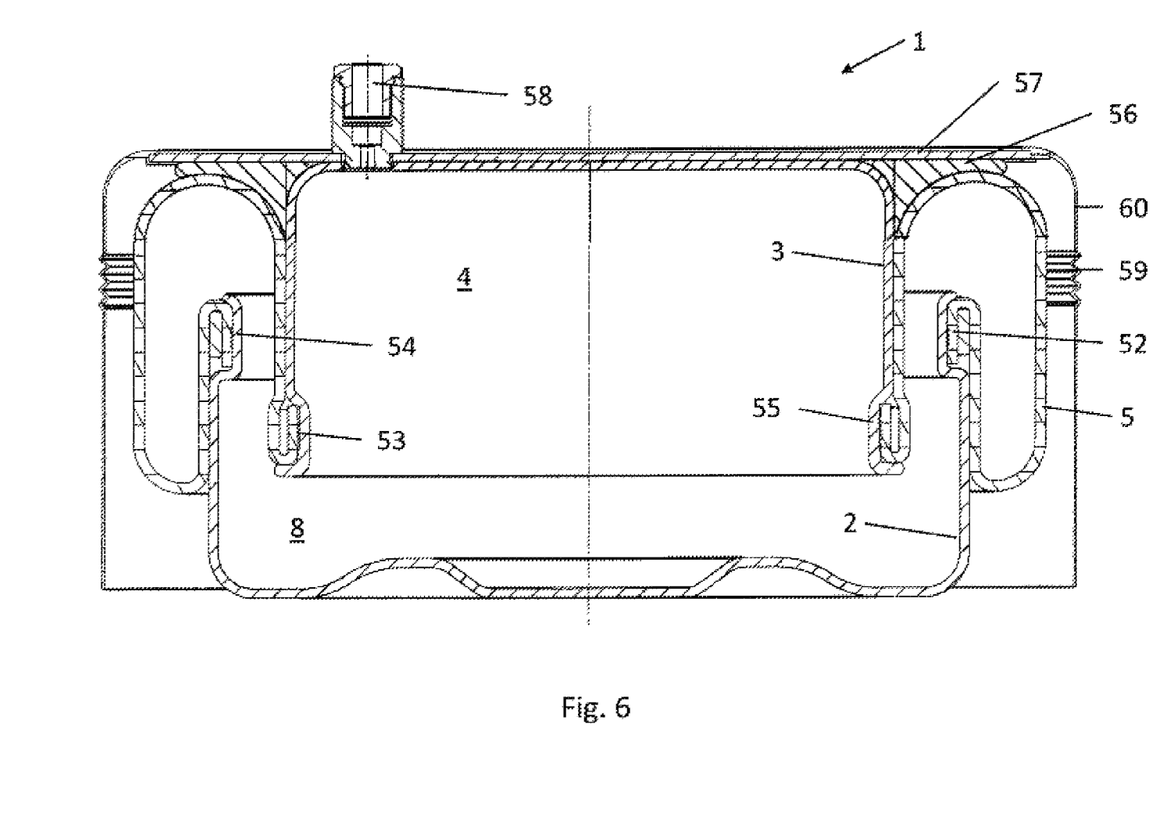
Figure 7:
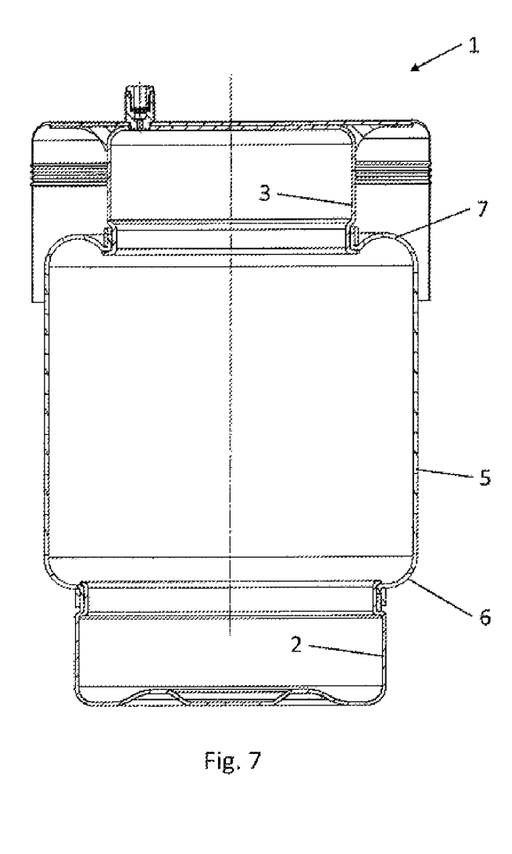

FIGS. 5, 6 and 7 show an embodiment of the air spring 1, in which the rolling pistons 2 and 3 are formed from deep-drawn metal sheets. A tubular rolling bellows which is preshaped conically and the ends 52 and 53 of which are fastened to the mutually facing inner edges 54 and 55 of the rolling pistons 2 and 3 is used as the rolling bellows 5. The concave base 34 on the upper rolling piston 3 is formed by an insert 56 which is attached to a reinforcing plate 57 of the upper rolling piston 3. The angle a of the base 34 here is approx. 100°. Furthermore, a compressed air valve 58 for supplying the compressed air to, or letting the compressed air out of, the compressed air space 4 is provided on the upper rolling piston 3. Furthermore, a protective hood 60, which is at least partially configured as an expansion bellows 59, is also provided on the reinforcing plate 57. The air spring 1 is illustrated in the neutral position thereof in FIG. 5. FIG. 6 shows the air spring in the fully deflected position, whereas FIG. 7 reproduces the air spring in the lifted position.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An air spring for a commercial vehicle with a combined damping function and lifting function, the air spring comprising:
   an upper rolling piston and a lower rolling piston disposed opposite to each other; and
   a rolling bellows enclosing a compressed air space and having double rolling folds, wherein pressure effective surfaces of the rolling folds are coordinated with each other in such a manner that, during dynamic spring operation of the air spring over a predetermined spring travel, the pressure effective surface of the rolling fold on the lower rolling piston is larger than the pressure effective surface of the rolling fold on the upper rolling piston, wherein the pressure effective surfaces of the rolling folds are approximately identical in size in a predetermined full rebound state of the air spring, and wherein, during the lifting function, following the full rebound state, the upper rolling fold is configured to roll on the upper rolling piston by means of an increase in compressed air in the compressed air space.

2. The air spring as claimed in claim 1, wherein an outside diameter of the lower rolling piston is larger than an outside diameter of the upper rolling piston.

3. The air spring as claimed in claim 1, wherein the lower rolling piston has a recess oriented towards the compressed air space that is configured to receive the upper rolling piston during a strong deflection.

4. The air spring as claimed in claim 1, wherein the lower rolling piston has a cylindrical outer surface.

5. The air spring as claimed in claim 1, wherein the upper rolling piston has a section having a cylindrical outer surface, and an adjoining, concave base.

6. The air spring as claimed in claim 5, wherein the concave base forms a circular arc of at least 90°.

7. The air spring as claimed in claim 1, wherein ends of the rolling bellows are fastened to mutually facing inner edges of the rolling pistons.

8. The air spring as claimed in claim 1, wherein the rolling bellows is a tubular rolling bellows.

9. The air spring as claimed in claim 8, wherein the tubular rolling bellows is preshaped conically.

10. The air spring as claimed in claim 1, wherein the rolling pistons are formed from deep drawn metal sheets.

\* \* \* \* \*